Oct. 12, 1965    J. L. STERISS    3,210,858
TRUE ADJUSTMENT DEVICE FOR AUTOMOBILE HEADLIGHTS
Filed April 15, 1963    3 Sheets-Sheet 1

INVENTOR.
John L. Steriss
BY
ATTORNEY.

Oct. 12, 1965   J. L. STERISS   3,210,858
TRUE ADJUSTMENT DEVICE FOR AUTOMOBILE HEADLIGHTS
Filed April 15, 1963   3 Sheets-Sheet 2
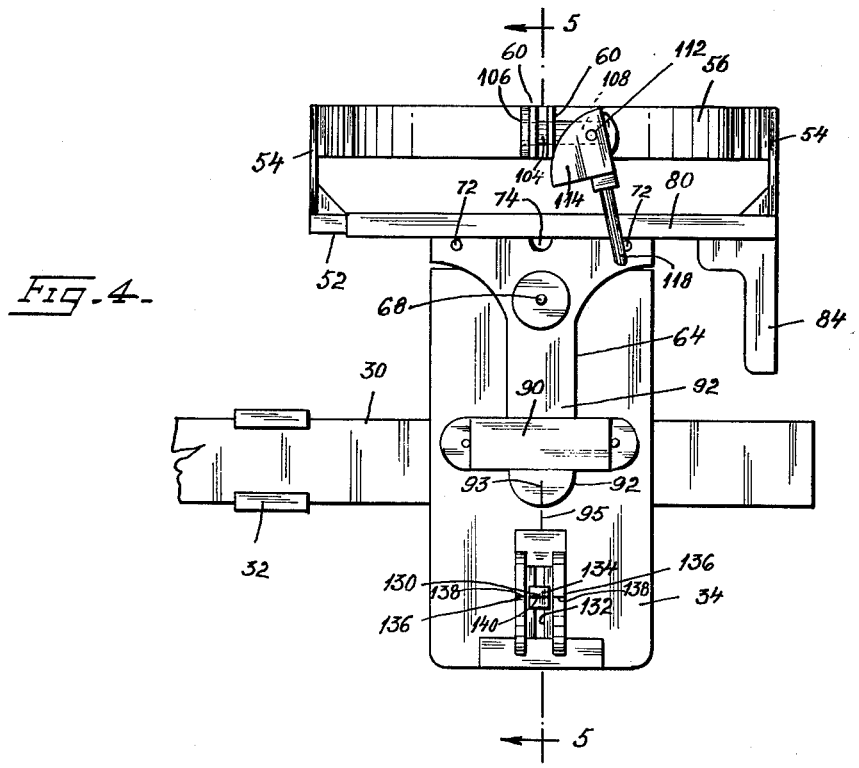
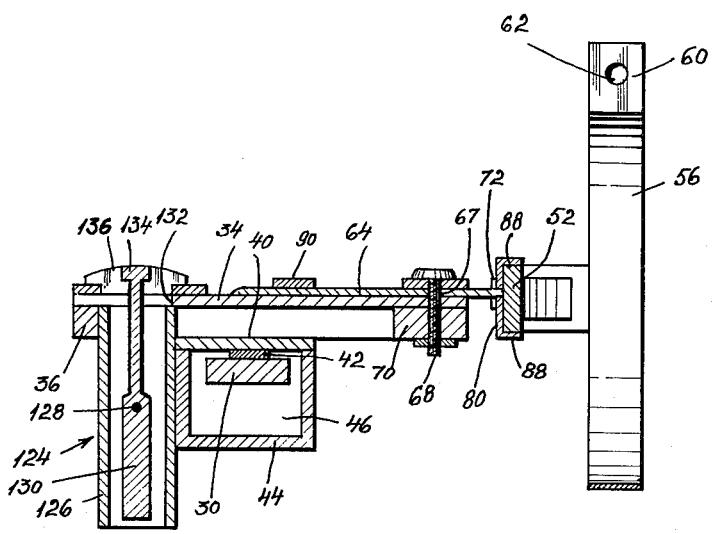
INVENTOR.
John L. Steriss
BY
ATTORNEY.

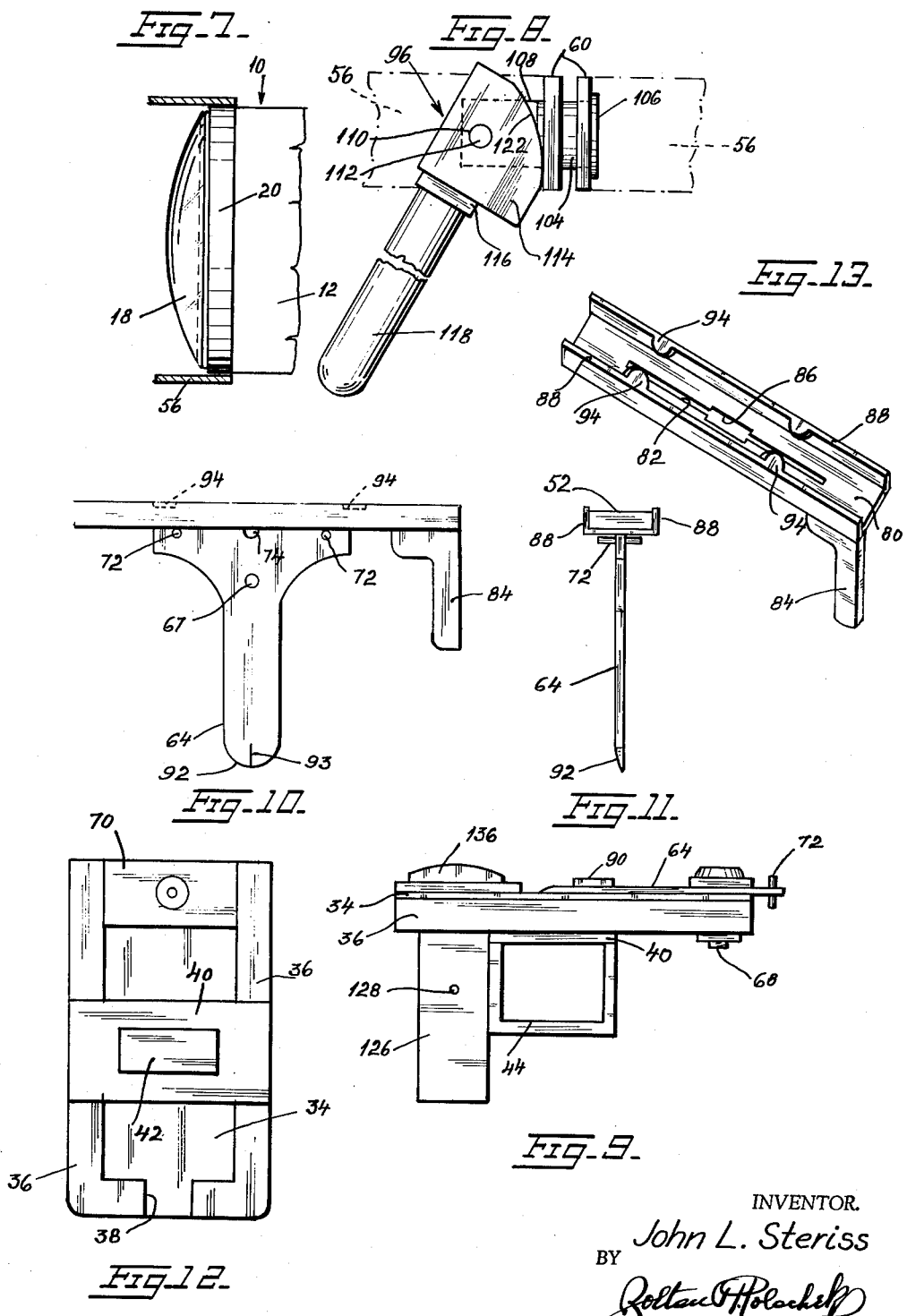

United States Patent Office 3,210,858
Patented Oct. 12, 1965

3,210,858
TRUE ADJUSTMENT DEVICE FOR AUTOMOBILE HEADLIGHTS
John L. Steriss, 4861 Broadway, New York, N.Y.
Filed Apr. 15, 1963, Ser. No. 273,174
13 Claims. (Cl. 33—180)

This invention relates to apparatus for use in adjusting vehicle headlamps and more particularly for use in adjusting headlamps of the universally mounted type.

An important object of the present invention is to provide simple, compact and efficient apparatus for mechanically or geometrically adjusting headlamps of the above type, up, down, inwardly or outwardly.

Another object of the invention is to provide apparatus for adjusting headlamps that is adjustable with facility and ease of operation.

A further object of the invention is to provide headlamp adjusting apparatus which is readily transportable and which requires a minimum of space for its use.

Yet another object of the invention is to provide headlamp adjusting apparatus which is positive in operation, convenient in use, easily installed in a working position and easily disconnected therefrom, economical to manufacture, and of general superiority and serviceability.

Still another object of the invention is to provide a novel construction for mounting the adjusting unit on the rim of any headlamp to be adjusted.

A specific object is to provide headlamp adjusting apparatus having a contractible band surrounding the headlamp with novel hand-operated means for quickly and easily contracting the aforesaid band around the headlamp rim.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a top plan view of a unit of the headlamp adjusting apparatus, on an enlarged scale, parts being shown broken away.

FIG. 5 is a vertical sectional view taken on the line 5—5 of FIG. 4.

FIG. 7 is an enlarged top plan view of a headlamp with the clamping ring shown mounted thereon, the ring being shown in section.

FIG. 8 is a top plan detail view of the ring clamping tool, parts being broken away.

FIG. 9 is a side elevational view of the parts shown in FIG. 5, the clamping ring and associated parts being omitted.

FIG. 10 is a top plan detail of the unit for horizontal adjustment.

FIG. 11 is an end view looking from the left of FIG. 10.

FIG. 12 is a bottom plan view of the unit supporting plate.

FIG. 13 is a perspective view of the locking plate unit.

Figure 1:
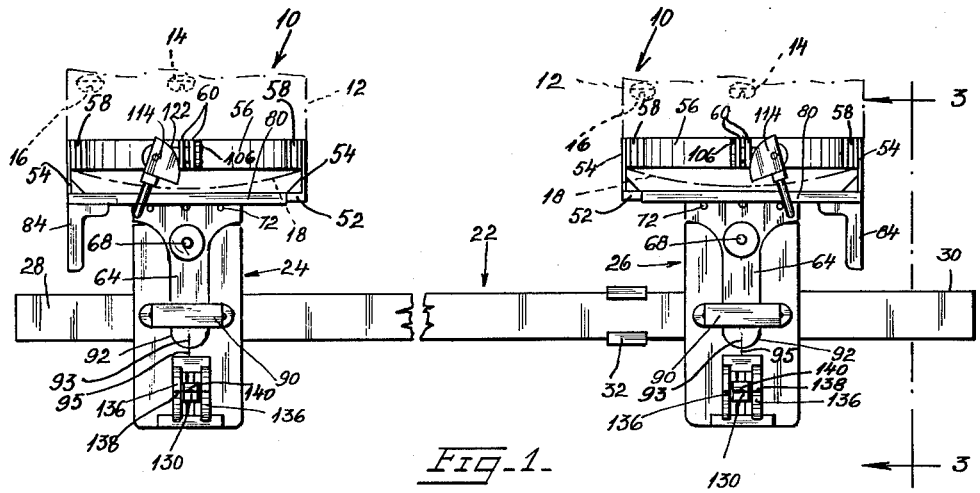
FIG. 1 is a top plan view showing the improved headlamp adjusting apparatus mounted upon the headlamps of an automobile, the headlamps being shown in dot-dash lines, parts being shown broken away.
Figure 2:
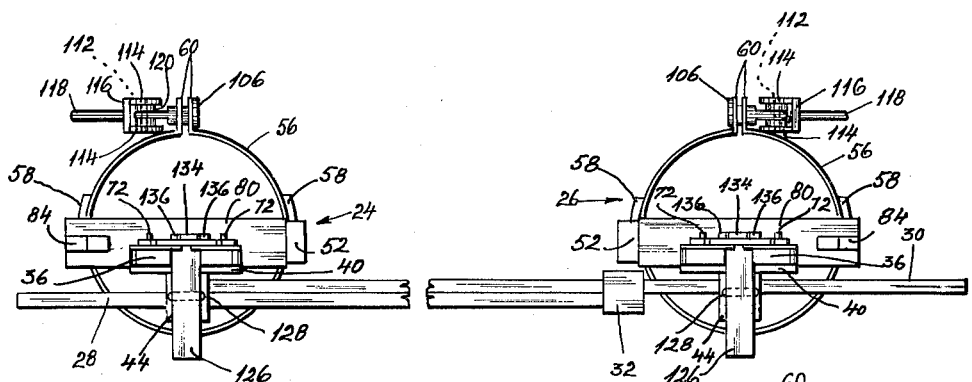
FIG. 2 is a front elevational view of the apparatus shown in FIG. 1, parts being shown broken away and the headlamps being omitted.
Figure 3:
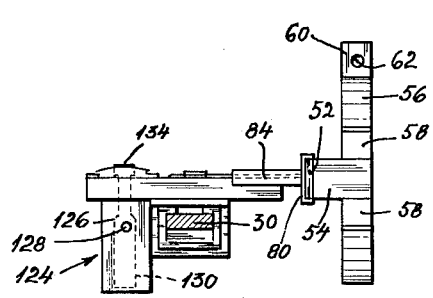
FIG. 3 is a vertical sectional view taken on the line 3—3 of FIG. 1.

Referring in greater detail to the drawings, in FIG. 1 a pair of headlamps 10, 10 of a vehicle is shown. Each headlamp 10 includes a housing 12, universally mounted on the vehicle in a conventional manner. In order to provide vertical and horizontal adjustment for the housing 12, vertical adjusting screw 14 and horizontal adjusting screw 16, respectively, are provided. The vertical and horizontal adjustments are conventional and well known. The headlamp 10 comprises a sealed beam unit having a lens 18 suitably mounted in the housing 12 by a conventional retaining ring 20. The sealed beam unit moves as a unit with the housing 12 in response to the universal movement and adjustment of the housing 12.

In accordance with the present invention, apparatus is provided for adjusting the headlamps 10, 10, upwardly, downwardly, inwardly and outwardly. This apparatus is illustrated in FIG. 1 and designated generally by the reference numeral 22. The apparatus is preferably formed of light-weight metal, preferably aluminum, and includes a pair of spaced adjusting units 24 and 26 slidably supported on superimposed slidable elongated flat smooth bars 28 and 30, respectively, tied together by split bands 32 (only one band being shown), secured to the ends of the bars. Adjusting unit 24 is fastened to bar 28 adjacent one end thereof, and adjusting unit 26 is fastened to bar 30 adjacent one end thereof.

Each of the adjusting units 24 and 26, as best seen in FIG. 4, consists of an elongated rectangular-shaped supporting plate 34 formed of light-weight metal such as aluminum. A downwardly extending flange 36 extends around the sides and one end of the plate, the other end being unobstructed. A slot 38 is formed in the flange of the flanged end. The flange is formed separately from the plate and may be secured to the plate by any suitable fastening means such as screws. A plate 40 spans the space between the sides of the flange midway the ends of the plate 34 and a block 42 is carried centrally of the plate 40 for fastening the unit to its respective bar 28 or 30. Block 42 may be secured to the top surface of its respective supporting bar by screws or the like. A U-shaped strap 44 is suitably fastened to the bottom surface of the spanning plate 40. The dimension of the strap is such that considerable clearance or space 46 is provided between the bight portion of the strap and the associated bar.

Figure 6:
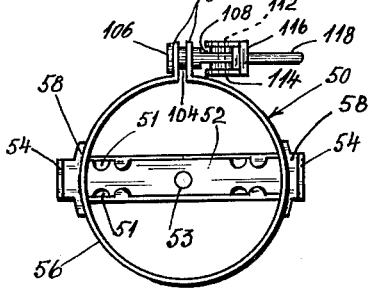
FIG. 6 is a top plan view of a headlamp clamping ring and associated parts.

The means for mounting the adjusting unit on the headlamp 10 will now be described. For this purpose, a mounting unit 50 as shown in FIG. 6 is provided. Unit 50 includes a thin narrow plate 52 with upstanding flanges 54 at the ends thereof. Pairs of notches 51 are formed in the long edge of the plate and a pin 53 depends therefrom at its center midway the ends thereof. A split ring 56 of spring metal is supported at the top of the flanges by means of arcuate-shaped blocks 58 secured to the top of the flanges and to the outer periphery of the ring. The plate and ring may be formed of lightweight metal such as aluminum.

Outwardly extending flanges 60 are formed on the split ends of the ring 56. Perforations 62 are formed in the flanges 60. The unit 50 is detachably connected to the supporting plate 34. This detachable connection includes a thin T-shaped metal plate 64. The T-shaped plate is pivotally mounted on the plate 34 adjacent one end thereof by means of a pivot pin 68 extending through a hole 67 in the T-shaped plate and an aligned hole in the plate 34 and journalled in a block 70 positioned and secured to the undersurface of plate 34, at its unflanged end. A pair of spaced pins 72 extend through the crosspiece of the T-shaped plate projecting on both sides thereof. Midway the ends of the crosspiece of plate 64 a notch 74 is formed therein.

A locking plate 80 is slidably mounted on the pins 72. Plate 80 has a central narrow slot 82 and a downwardly extending handle 84 at one end thereof for sliding the plate on the pins 72. Slot 82 is formed with a long notched portion 86 midway its ends. This slot 82 slidably receives the top edge of the crosspiece of the T-shaped plate 64. Sliding movement of the plate 80 is stopped by engagement of the end edges of the notch 86 of plate 80 against the depending pin 53 on plate 52. Plate 80 is formed with upstanding flanges 88 along its long edges, projecting slightly above the top of plate 52.

The T-shaped plate 64, and plate 80 constitute a pivotally mounted unit, limited in its pivotal movements by a strap 90 secured at its ends to the top face of plate 34 as viewed in FIG. 4 with its body slightly offset from the surface of the plate to provide a clearance for the stem 92 of the T-shaped plate 64. A vertical indicating line 93 is placed at the bottom end of the stem 92 adapted to coact with an adjacent vertical line 95 on plate 34 as viewed in FIG. 4.

The ring carrying unit 50 is adapted to be detachably mounted on the pivot unit by inserting the pin 53 on the plate 52 through notch 86 in plate 80 and into the aligned notch 74 in plate 64. When thus mounted, the top surface of the plate 52 of the ring carrying unit is below the top edges of the flanges 88 on the slidable plate 80. Plate 80 carries inwardly extending lugs 94 on the top edges of its flanges 88 which lugs overlap the plate 52 of the ring carrying unit thereby holding the ring carrying unit on the pivotal unit. In order to remove the ring carrying unit 50 for replacement by a different sized ring, plate 80 is slid by means of handle 84 until its lugs 94 are aligned with notches 51 on plate 52, when the unit 50 can be lifted off of the sliding and locking plate 80.

When the ring carrying unit 50 and the pivotal unit are thus detachably and pivotally mounted, the pivotal unit is horizontally disposed and the ring 56 of the ring carrying unit 50 can be inserted over the locking ring 20 of the headlamp 10. The ring 56 is clamped to the locking ring by means of a clamping unit 96 (FIG. 8) fastened to the ring 56 adjacent its split ends in any suitable manner. The clamping unit comprises a round pin 104 extending through the perforations 62 in the flanges 60 and is fixed to one flange 60 and is held against withdrawal therethrough by a disk 106 on the outer end thereof. The inner end of the pin 104 is flattened as indicated at 108 with a transverse hole 110 therein. A pivot pin 112 extends through the hole 110 and carries a pair of spaced connected camming plates 114, 114. The plates 114 are connected by a connecting plate 116. A round rod extends from the plate 116 and serves as a handle 118. Washers 120 are mounted on the pivot pin between the flattened portions 108 and the camming plates 114. The plates 114 are formed with camming faces 122. The slidable flange 60 is disposed in the path of swinging movement of the camming plates 114 so that it is adapted to be engaged by the camming faces 122 thereof and moved in the direction of the fixed flange 60 to which pin 104 is attached, thereby clamping the flanges 60 of the ring 56 together and thereby clamping the ring 56 onto the locking ring 20 of the headlamp 10.

The invention also contemplates means for adjusting the headlamps 10, 10 up and down in a vertical plane so that the headlamps each has a predetermined vertical inclination to give the desired projection to the headlamp beam. For this purpose, a gravity responsive device 124 is provided. This operation is permissible as the headlamps 10, 10 are automatically movable in a vertical plane by turning screw 16. The device 124 includes a tubular housing 126 rectangular in cross section depending from the bottom surface of the plate 34, at its flanged end, and secured thereto by screws or the like. A pivot pin 128 extends across the space between the side walls of the housing and is journalled in said side walls. A pendulum 130 is pivotally mounted on the pin. One end of the pendulum extends through a slot 132 in the plate 34 in line with the housing 126, and a head 134 is formed on the protruding end of the pendulum. Upstanding plates 136 are mounted edgewise on the top surface of plate 34 and secured thereto by screws or the like on both sides of the slot 132. Marks or lines 138 are formed across the top surfaces of the plates 136 and a mark or line 140 is formed across the top surface of the head 134 of the pendulum 130. The head swings in the space between the plates 136 and close thereto so that the marks or line thereon and on the head are adapted to coact. The pendulum 130 is so balanced on the pin 128 that it is adapted to move by gravity when screw 16 is turned. When screw 16 is turned to bring the cross line 140 on the swinging pendulum 130 in line with the lines 138 on plates 136, 136, the axis of each headlamp 10 will have a predetermined angle relative to the horizontal.

When the ring supporting unit 50 and the pivotal unit are thus detachably and pivotally mounted, the pivotal unit is horizontally disposed so that the ring 56 of the ring-carrying unit 50 can be inserted over the locking ring 20 of the headlamp 10 and clamped thereon by the clamping unit 96. When the unit 50 is thus positioned on the housing 12, by merely turning the screw 16 the headlamp 10 may be forced horizontally into alignment with predetermined settings for perfect accuracy; and by merely turning the screw 14 the headlamp 10 may be forced vertically into alignment with predetermined settings for perfect accuracy. When the indicating line 93 carried by the stem 92 of T-shaped plate 64 is in alignment with the vertical line 95 on the supporting plate 34, the headlamps are in correct position horizontally. When the indicating line 140 carried by pendulum 130 is in alignment with the lines 138 on plates 136, the headlamps are in correct position vertically.

After vertical and horizontal adjustment of the headlamps has been completed, the adjusting apparatus is removed by releasing the clamping units 96.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In apparatus for use in the adjustment of universally mounted vehicle headlamps having housings with locking rings, a pair of elongated superimposed flat bars slidable relative to each other, headlamp movable units mountable on the locking rings of the headlamp housings, said units including means for connecting the bars to the locking rings of the housings of the headlamps, said means of connection each including a supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring.

2. In apparatus for use in the adjustment of universally mounted vehicle headlamps having housings with locking rings, a pair of elongated superimposed flat bars slidable relative to each other, headlamp movable units mountable on the locking rings of the headlamp housings, said units including means for connecting the bars to the locking rings of the housings of the headlamps, said means of connection each including a supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring, said pivotal unit swingable in a horizontal plane and adapted to be titled in a vertical plane.

3. In apparatus for use in the adjustment of universally mounted vehicle headlamps having housings with locking rings, a pair of elongated superimposed flat bars slidable relative to each other, headlamp movable units mountable on the locking rings of the headlamp housings, said units including means for connecting the bars to the locking rings of the housings of the headlamps, said means of connection each including a supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring, said split ring having outwardly extending flanges on the split ends thereof, said means for clamping the split ring on the locking ring including a pair of camming plates associated with one of said ring flanges and a handle connected to said camming plates for moving the camming faces thereof against said one flange.

4. In apparatus for use in the adjustment of universally mounted vehicle headlamps, a pair of elongated superimposed flat bars slidable relative to each other, a supporting plate secured flatwise to an end of each bar, headlamp movable units mountable on the locking rings of the headlamp housings, said units including means for connecting the bars to the locking rings of the housings of the headlamps, said connecting means each including a plate pivotally mounted on the flatwise supporting plate, an elongated plate carrying a split ring supported on said pivotal plate, and means for clamping the split ring to the locking ring.

5. In apparatus for use in the adjustment of universally mounted vehicle headlamps, a pair of elongated superimposed flat bars slidable relative to each other, a supporting plate secured flatwise to an end of each bar, headlamp movable units mountable on the locking rings of the headlamp housings, said units including means for connecting the bars to the locking rings of the housings of the headlamps, said connecting means each including a plate pivotally mounted on the flatwise supporting plate, an elongated plate carrying a split ring supported on said pivotal plate, and means for clamping the split ring to the locking ring, each of said split rings having outwardly extending flanges on the ends thereof, said means for clamping the split ring to the locking ring including a pair of camming plates associated with one of the flanges on the split ring and a handle connected to said camming plates for moving the camming faces thereof against said one flange.

6. In apparatus for use in the adjustment of universally mounted vehicle headlamps, a pair of elongated superimposed flat bars slidable relative to each other, a supporting plate secured flatwise to an end of each bar, headlamp movable units mountable on the locking rings of the headlamp housings, said units including means for connecting the bars to the locking rings of the housings of the headlamps, said connecting means each including a plate pivotally mounted on the flatwise supporting plate, an elongated plate carrying a split ring supported on said pivotal plate, means for clamping the split ring to the locking ring, and means for locking the split rings to the elongated supporting plates, each of said locking means including a plate slidable on the pivotal plate, said slidable plate carrying lugs on the top edges thereof adapted to coact with the edges of the elongated plates for locking the ring supporting plates, and handles for moving said slidable plates.

7. In apparatus for use in the adjustment of universally mounted vehicle headlamps, a pair of elongated superimposed flat bars slidable relative to each other, a supporting plate secured flatwise to an end of each bar, headlamp movable units mountable on the locking rings of the headlamp housings, said units including means for connecting the bars to the locking rings of the housings of the headlamps, said connecting means each including a plate pivotally mounted on the flatwise supporting plate, an elongated plate carrying a split ring supported on said pivotal plate, means for clamping the split ring to the locking ring, and devices for individually swinging the headlamps on a horizontal plate, each device including a T-shaped plate pivotally mounted on the elongated supporting plate in a plane parallel to the plane of the supporting plate, a flanged plate slidably carried by the T-shaped plate in a plane perpendicular to the plane of the T-shaped plate, the ring supporting plate having notches in the long edges thereof, said flanged plate having inwardly extending spaced lugs on the top edges of the flanges coacting with the ring supporting plate for holding the ring supporting plate in position, said lugs when moved into alignment with the notches permitting the removal of the other plate and supporting ring.

8. In apparatus for use in the adjustment of universally mounted vehicle headlamps, a pair of elongated superimposed flat bars slidable relative to each other, a supporting plate secured flatwise to an end of each bar, headlamp movable units mountable on the locking rings of the headlamp housings, said units including means for connecting the bars to the locking rings of the housings of the headlamps, said connecting means each including a plate pivotally mounted on the flatwise supporting plate, an elongated flat plate carried by said supporting plate in a plane perpendicular to the plane of the body of the supporting plate, an elongated plate carrying a split ring supported on said pivotal plate, means for clamping the split ring to the locking ring, and devices for individually swinging the headlamps on a horizontal plate, each device including a T-shaped plate pivotally mounted on the elongated supporting plate in a plane parallel to the plane of the supporting plate, a flanged plate slidably carried by the T-shaped plate in a plane perpendicular to the plane of the T-shaped plate, the ring supporting plate having notches in the long edges thereof, said flanged plate having inwardly extending spaced lugs on the top edges of the flanges coacting with the ring supporting plate for releasably holding the ring supporting plate in position, said supporting plate having an indicating line disposed longitudinally thereof, the stem of said T-shaped plate having an indicating line adapted to coact with the line on said supporting plate for indicating correct horizontal adjustment of the headlamps.

9. Appartus for use in the adjustment of universally mounted vehicle headlamps having housings with locking rings therearound, said apparatus comprising headlamp movable units mountable on the locking rings of the headlamp housings, elongated superimposed bars supporting said units, said units including means for connecting the bars to the locking rings of the housing of the headlamps, said means of connection each including an elongated supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring.

10. Apparatus for use in the adjustment of universally mounted vehicle headlamps having housings with locking rings therearound, said apparatus comprising headlamp movable units mountable on the locking rings of the headlamp housings, elongated superimposed bars supporting said units, said units including means for connecting the bars to the locking rings of the housings of the headlamps, said means of connection each including an elongated supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring, said units swingable in a horizontal plane and adapted to be tilted in a vertical plane.

11. Apparatus for use in the adjustment of universally mounted vehicle headlamps having housings with locking rings therearound, said apparatus comprising headlamp movable units mountable on the locking rings of the headlamp housings, elongated superimposed bars supporting said units, said units including means for connecting the bars to the locking rings of the housings of the headlamps, said means of connection each including an elongated supporting plate secured flatwise to an end of each supporting bar, a pivotally mounted unit carried at one end of each supporting plate, said pivotally mounted unit including a split ring adapted to be sleeved around the adjacent locking ring, and means for clamping the split ring on the locking ring, said bars and supported units being automatically tiltable in a plane perpendicular to the plane of the supporting plate.

12. Apparatus for use in the adjustment of universally mounted vehicle headlamps having housings with locking rings therearound, said apparatus comprising headlamp movable units mountable on the locking rings of the headlamp housings, elongated superimposed bars supporting said units, said units including means for connecting the bars to the locking rings of the housings of the headlamps, said means of connection each including an elongated supporting plate secured flatwise to an end of each supporting bar, a pivotally mounted unit carried at one end of each supporting plate, said pivotally mounted unit including a split ring adapted to be sleeved around the adjacent locking ring, means for clamping the split ring on the locking ring, and pendulum means carried by the supporting plate for indicating the degree of tilting of the tiltable elements.

13. Apparatus for use in the adjustment of universally mounted vehicle headlamps having housings with locking rings therearound, said apparatus comprising headlamp movable units mountable on the locking rings of the headlamp housings, elongated superimposed bars supporting said units, said units including means for connecting the bars to the locking rings of the housings of the headlamps, said means of connection each including an elongated supporting plate secured flatwise to an end of each supporting bar, a pivotally mounted unit carried at one end of each supporting plate, said pivotally mounted unit including a split ring adapted to be sleeved around the adjacent locking ring, means for clamping the split ring on the locking ring, and a pendulum carried by the supporting plate, said pendulum having a head with a line across the surface thereof, a pair of spaced plates on both sides of the movable head of the pendulum, said plates having aligned lines on the top surfaces thereof for co-acting with the line on the head of the pendulum to indicate the degree of tilting of the tiltable elements.

References Cited by the Examiner

UNITED STATES PATENTS

| | | | |
|---|---|---|---|
| 1,407,803 | 1/22 | Patterson | 33—203.21 |
| 1,743,546 | 1/30 | Hill | 33—180 |
| 1,838,226 | 12/31 | Jenkins | 33—180 |
| 2,337,502 | 12/43 | Scott et al. | 33—46.2 |
| 2,557,893 | 6/51 | Russell et al. | 33—180 |

ISAAC LISANN, *Primary Examiner.*